United States Patent [19]
Yoshino et al.

[11] Patent Number: 5,371,856
[45] Date of Patent: Dec. 6, 1994

[54] TRANSFER DATA STORAGE SYSTEM

[75] Inventors: Toyohiko Yoshino; Yuji Takahashi; Hideki Nagasaki, all of Kawasaki, Japan

[73] Assignee: Fujitsu Limited, Kawasaki, Japan

[21] Appl. No.: 810,712

[22] Filed: Dec. 18, 1991

[30] Foreign Application Priority Data

Dec. 20, 1990 [JP] Japan .................. 2-412352

[51] Int. Cl.$^5$ .................. G06F 13/00
[52] U.S. Cl. .................. 395/250; 395/425
[58] Field of Search .................. 395/425, 250

[56] References Cited

U.S. PATENT DOCUMENTS 4,502,115  2/1985  Eguchi .................. 395/425

FOREIGN PATENT DOCUMENTS 168536  10/1982  Japan .

*Primary Examiner*—Dale M. Shaw
*Assistant Examiner*—Gallrav Bhatia

[57] ABSTRACT

A transfer data storage system is used in a control processing unit which receives a transfer data in which a plurality of kinds of data having arbitrary data lengths are allocated within each frame, extracts each data within the transfer data included in a predetermined number of frames by the kind of data, and successively stores the extracted data into a memory. The transfer data storage system includes a register having a plurality of stages for holding values corresponding to the number of kinds of data while circulating the values in synchronism with data transfer times when the kind of data of the transfer data being transferred is switched, an adder for adding a value held in a first stage of the register and data length information of each kind of data obtained in a circulating manner, and for inputting an added value to a last stage of the register, and a write counter for loading the value held in the first stage of the register as an initial value at a start of a counting operation and counting a clock signal from the loaded value when the received transfer data corresponds to a start data of the kind of data, and for ending the counting operation when the received transfer data corresponds to an end data of the kind of data.

6 Claims, 7 Drawing Sheets

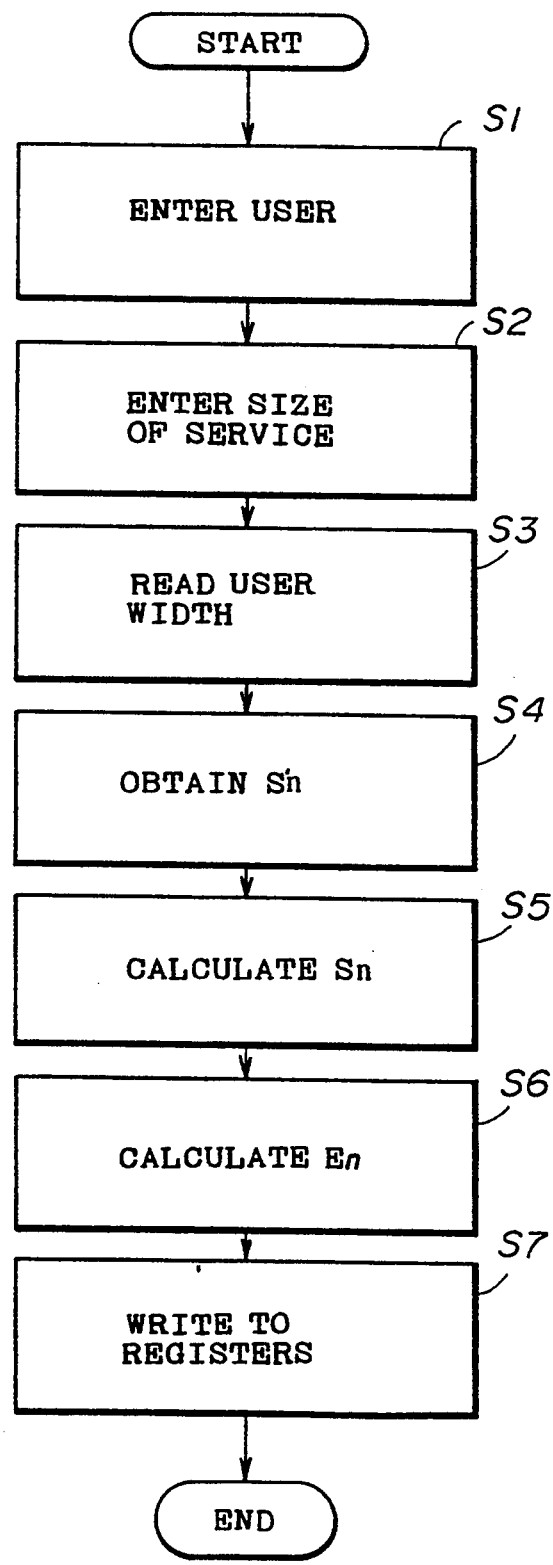

5,371,856

TRANSFER DATA STORAGE SYSTEM

BACKGROUND OF THE INVENTION

The present invention generally relates to transfer data storage systems, and more particularly to a transfer data storage system which receives a transfer data in which a plurality of kinds of data having arbitrary data lengths are allocated within each frame, extracts the data by the kind of data from the transfer data amounting to a prescribed number of frames, and successively stores the extracted data into a memory.

FIG. 1 shows an example of a transfer data of a subscriber line, where a plurality of kinds of data having arbitrary data lengths are allocated within each frame. This transfer data has one frame formed from a unit of 8 kb/s, and 16 subscriber data are allocated within prescribed positions and transferred within one frame. The 16 subscriber data respectively have arbitrary data lengths depending on the subscriber. In a communication processing system, such a transfer data is multiplexed for every 400 b/s (2.5 ms), for example, with a unit of 20 frames. As shown in FIG. 2, the 16 subscriber data included in the transfer data amounting to 20 multiplexed frames are written into a random access memory (RAM) in the communication processing system for each subscriber.

In FIG. 1, $S'ni$ represents starting position information of an nth subscriber data within the transfer data, and $E'ni$ represents end position information of the nth subscriber data, where $i = 1, \ldots, 20$. In addition, $20 \times Sn$ in FIG. 2 represents storage start address information of the nth subscriber data, and $20 \times En$ represents storage end address information of the nth subscriber data, where $n = 1, \ldots, 16$. The starting position information $S'ni$ and the end position information $E'ni$ of the nth subscriber data are defined from the start of the frame, and thus, the position information may take the same value for different frames i. For this reason, the start and end position information will hereinafter be denoted by $S'n$ and $E'n$, respectively. On the other hand, the same subscriber data has the same data length within the 20 frames, and the following relationship stands.

$$(20En - 20Sn)/20 = En - Sn = E'n - S'n$$

Conventionally, when carrying out the process of converting the above described frame format, a number of RAMs amounting to the number of subscribers are provided, and each subscriber data within the received transfer data is stored independently into the corresponding one of the RAMs. The frame format conversion is realized by successively reading the subscriber data stored in the RAMs, and a speed conversion is made by successively storing the read subscriber data into different RAMs.

However, according to the conventional method described above, there is a problem in that a large hardware is required to make the data transfer. In addition, because the data lengths of the subscriber data within the transfer data are set arbitrarily and the sequence of the subscriber data is also set arbitrarily, there is a problem in that the control of the write operations of the RAMs becomes complex.

SUMMARY OF THE INVENTION

Accordingly, it is a general object of the present invention to provide a novel and useful transfer data storage system in which the above described problems are eliminated.

Another and more specific object of the present invention is to provide a transfer data storage system for a control processing unit which receives a transfer data in which a plurality of kinds of data having arbitrary data lengths are allocated within each frame, extracts each data within the transfer data included in a predetermined number of frames by the kind of data, and successively stores the extracted data into memory means, wherein the transfer data storage system comprises first register means having a plurality of stages for holding values amounting to the number of kinds of data while circulating the values in synchronism with times when the kind of data of the transfer data being transferred is switched, adder means for adding a value held in a first stage of the first register means and data length information of each kind of data obtained in a circulating manner, and for inputting an added value to a last stage of the first register means, and write counter means for loading the value held in the first stage of the first register means as an initial value at a start of a counting operation and counting a clock signal from the loaded value when the received transfer data corresponds to a start data of the kind of data, and for ending the counting operation when the received transfer data corresponds to an end data of the kind of data. The received transfer data is written into the memory means at address positions specified by a counted value of the write counter means. According to the transfer data storage system of the present invention, it is possible to successively store the data within the transfer data by the kind of data without the need for a complex control, and the transfer data storage can be realized with a relatively simple hardware.

Other objects and further features of the present invention will be apparent from the following detailed description when read in conjunction with the accompanying drawings.

BRIEF DESCRIPTION OF THE DRAWINGS

FIG. 7 is a flow chart for explaining the general operation of the present invention.

DESCRIPTION OF THE PREFERRED EMBODIMENTS

Figure 3:
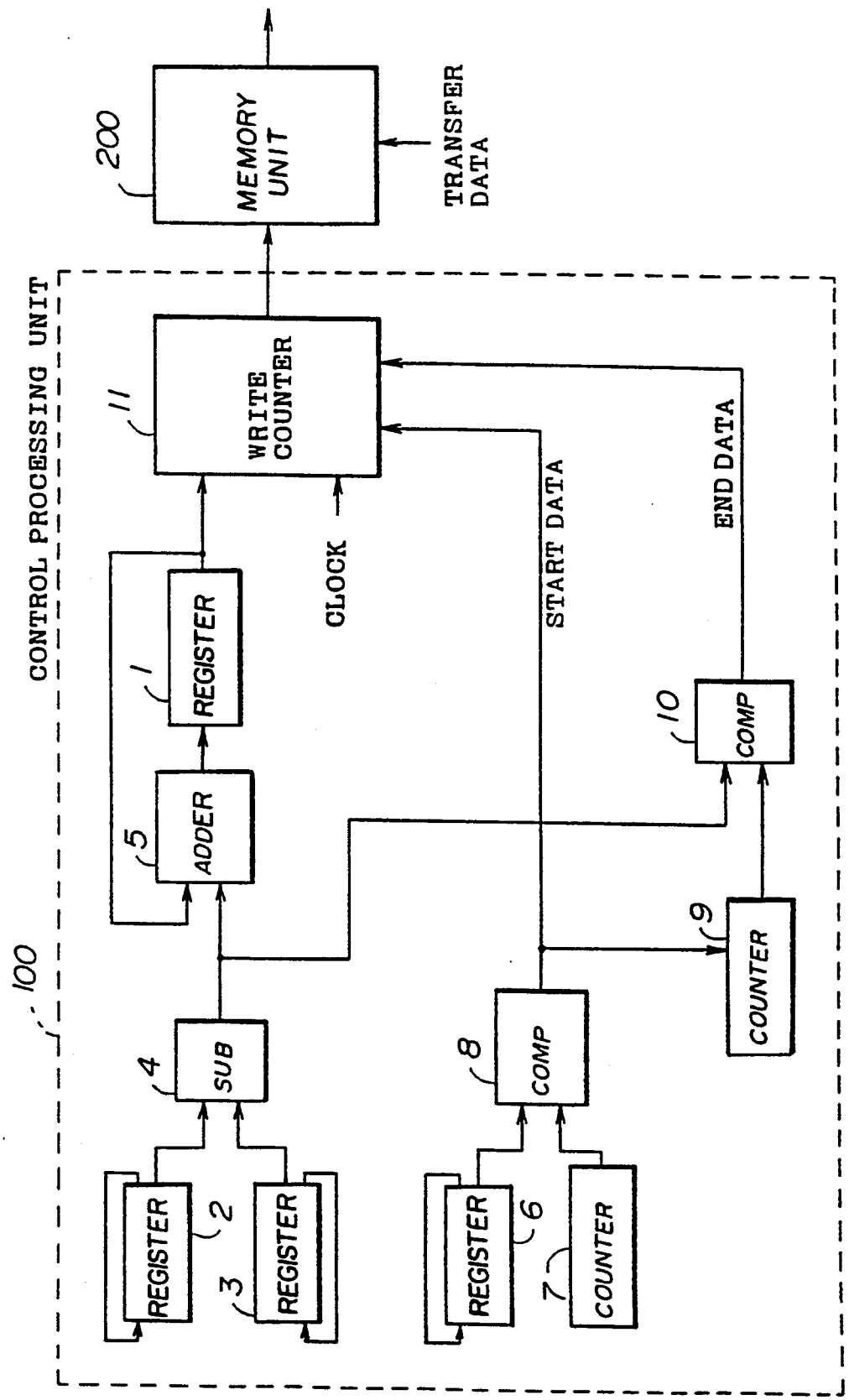
FIG. 3 is a system block diagram for explaining the operating principle of the present invention.

First, a description will be given of the operating principle of the present invention, by referring to FIG. 3. FIG. 3 shows a control processing unit 100 and a memory unit 200. The control processing unit 100 receives a transfer data in which a plurality of kinds of data having arbitrary data lengths are allocated within each frame. The control processing unit 100 extracts the data by the kind of data from the transfer data amounting to a prescribed number of frames, and successively stores the extracted data into the memory unit 200.

The control processing unit 100 includes a first register 1, a second register 2, a third register 3, a subtracting circuit 4, an adding circuit 5, a fourth register 6, a first counter 7, a first comparator 8, a second counter 9, a second comparator 100, and a write counter 11 which are connected as shown.

The first register 1 holds holding values amounting to the number of kinds of data while circulating the holding values in synchronism with transfer times of start data of the kinds of data, and this first register 1 holds storage start address information of each kind of data as initial values. The second register 2 holds values which are obtained by subtracting the prescribed number of frames from the storage start address information of each kind of data while circulating the values in synchronism with the transfer times of the start data of the kinds of data. The third register 3 holds values which are obtained by subtracting the prescribed number of frames from storage end address information of each kind of data while circulating the values in synchronism with the transfer times of the start data of the kinds of data.

The subtracting circuit 4 calculates a difference value between the value held in the first stage of the second register 2 and the value held in the first stage of the third register 3. The adding circuit 5 calculates an added value by adding the value held in the first stage of the first register 1 and the difference value calculated by the subtracting circuit 4, and this added value is input to the last stage of the first register 1. The fourth register 6 holds the start position information of the kinds of data while circulating this information in synchronism with the transfer time of the start data.

The first counter 7 starts to count a clock signal from zero every time the start position of the frame is reached. The first comparator 8 compares the value held in the first stage of the fourth register 6 and the counted value of the first counter 7, so as to detect the transfer time of the start data of each kind of data. The second counter 9 starts to count the clock signal from zero every time the first comparator 8 detects the transfer time of the start data. The second comparator 10 compares the difference value calculated by the subtracting circuit 4 and the counted value of the second counter 9, so as to detect the transfer time of the end data of each kind of data. The write counter 11 loads the value held in the first stage of the first register and starts to count from the loaded value when the first comparator detects the start data. The write counter 11 ends the counting operation when the second comparator 10 detects the end data.

Figure 1:
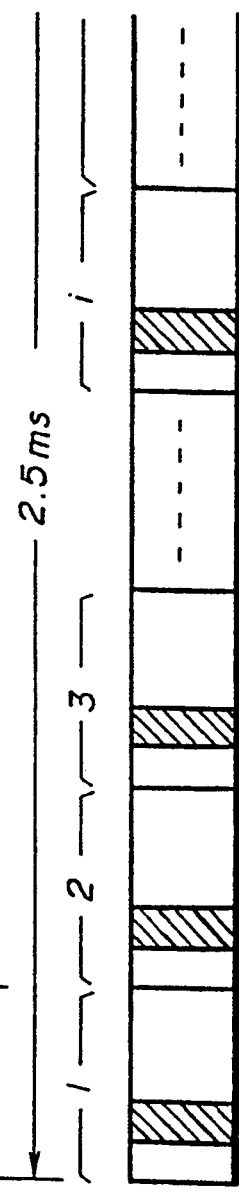
FIG. 1 shows an example of a transfer data.
Figure 1:
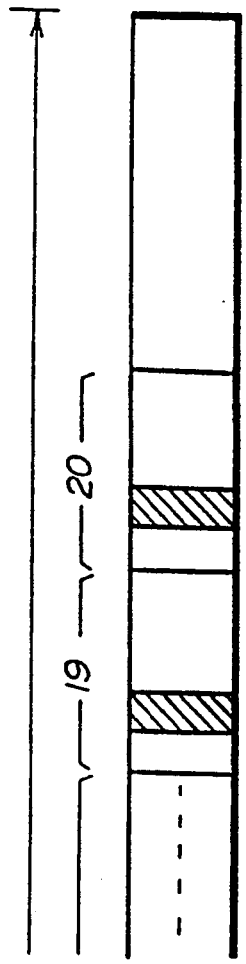
Figure 2:
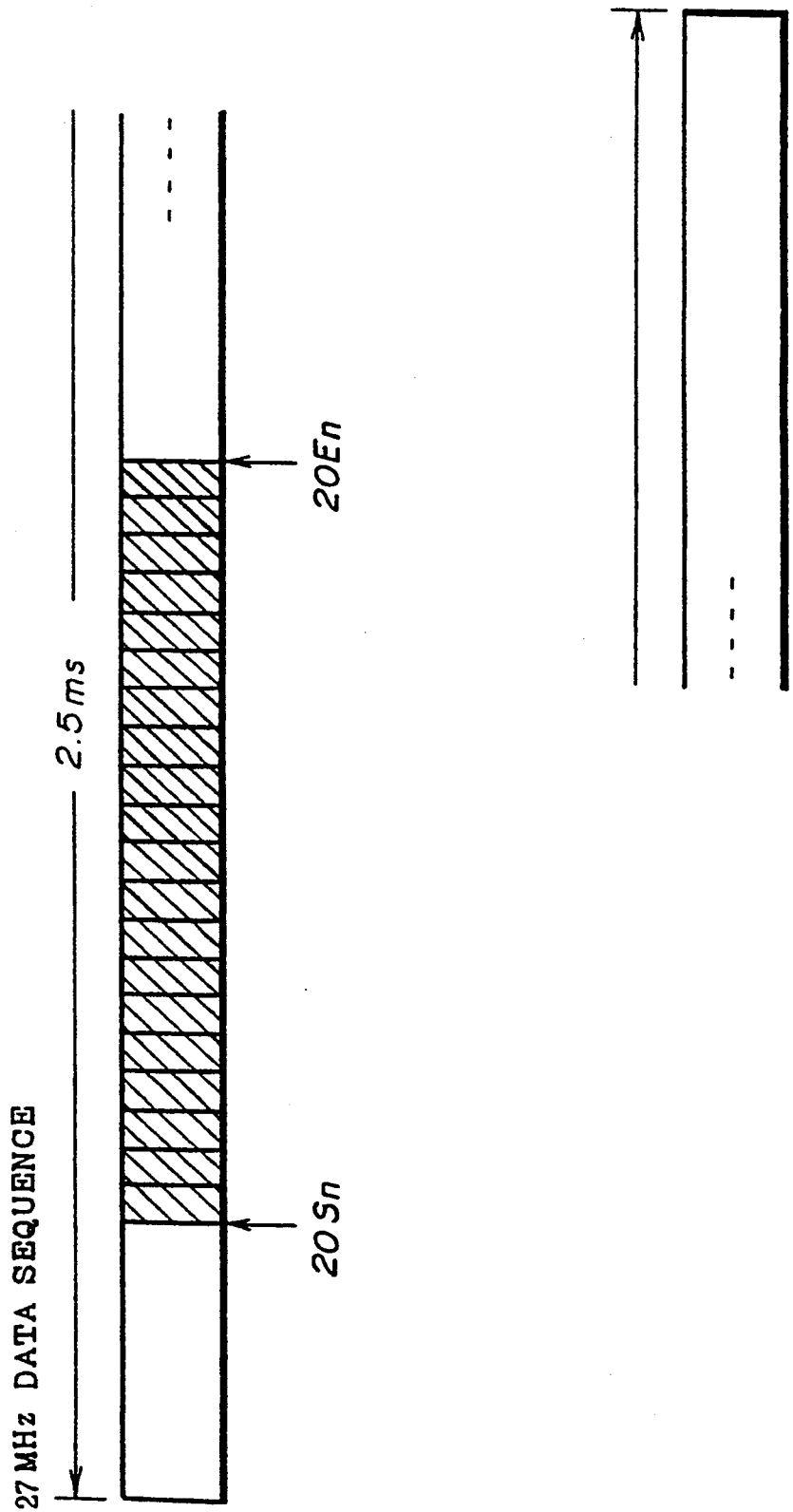
FIG. 2 is a diagram for explaining a conventional process of storing the transfer data.

For the sake of convenience, the particular example shown in FIGS. 1 and 2 will be used to explain the operating principle of the present invention. In this case, the first register 1 in the initial state holds 16 $20S_n$ in the transferring sequence. The second register 2 in the initial state holds 16 $S_n$ in the transferring sequence. The third register 3 in the initial state holds 16 $E_n$ in the transferring sequence. In addition, the fourth register 6 holds 16 $S'_n$ in the transferring sequence.

On the other hand, the subtracting circuit 4 calculates $E_n - S_n$ according to the circulation format. The adding circuit 5 adds the calculated $E_n - S_n$ (hereinafter simply referred to as $\Delta_n$) to the $20S_n$ held in the first register according to the circulation format. At the start of the reception of the first frame of the transfer data, the first register 1 holds $20S_n$ in the transferring sequence. But at the start of the reception of the second frame of the transfer data, the first register 1 holds $20S_n + \Delta_n$ in the transferring sequence. As the reception of the transfer data progresses, the first register 1 holds $20S_n + 2\Delta_n$ at the start of the reception of the third frame of the transfer data and holds $20S_n + \Delta_n$ at the start of the reception of the fourth frame of the transfer data.

During the above described operation, the first comparator 8 detects the positions of the 16 $S'_n$ prescribed within the transfer data according to the circulation format. On the other hand, the second comparator 10 detects the position of the 16 $E'_n$ corresponding to the detected $S'_n$ according to the circulation format. The write counter 11 operates in response to the detection processes of the first and second comparators 8 and 10. In other words, the write counter 11 loads the value held in the first stage of the first register 1 and starts to count from this value when the first comparator 8 detects the position of $S'_n$, and ends the counting operation when the second comparator 10 detects the position of $E'_n$.

Accordingly, the write counter 11 counts from $20S_1$ to $20S_1 + \Delta_1$ when receiving the first frame of the transfer data, next counts from $20S_2$ to $20S_2 + \Delta_2$, then counts from $20S_3$ to $20S_3 + \Delta_3$, and continues the counting operation until finally counting from $20S_{16}$ to $20S_{16} + \Delta_{16}$. When receiving the second frame of the transfer data, the write counter 11 counts from $20S_1 + \Delta_1$ to $20S_1 + 2\Delta_1$, next counts from $20S_2 + \Delta_2$ to $20S_2 + \Delta_2$, then counts from $20S_3 + \Delta_3$ to $20S_3 + \Delta_3$, and continues the counting operation until finally counting from $20S_{16} + \Delta_{16}$ to $20S_{16} + 2\Delta_{16}$. The write counter 11 continues similar counting operations up to the twentieth frame of the transfer data.

The received transfer data are written into the memory unit 200 at the address positions specified by the counted values of the write counter 11, responsive to the counting operations of the write counter 11.

Therefore, according to the present invention, no complex control is necessary when receiving the transfer data in which the plurality of kinds of data having arbitrary data lengths are allocated within each frame and extracting the data by the kind of data from the transfer data amounting to the prescribed number of frames so as to successively store the extracted data into the memory unit 200.

Next, a description will be given of an embodiment of the transfer data storage system according to the present invention, by referring to FIG. 4. A control processing unit 100 shown in FIG. 4 converts the transfer data having the format structure described in conjunction with FIG. 1 into the data having the data structure described in conjunction with FIG. 2 and writes the data into first and second RAMs 200a and 200b. A read counter 300, a serial-to-parallel (S/P) converting circuit 400 and a parallel-to-serial (P/S) converting circuit 500 are coupled to the first and second RAMs 200a and 200b.

The first and second RAMs 200a and 200b are provided in order to prevent access to identical write and read addresses of the same RAM. The read counter 300 is used when making a read operation from the first and second RAMs 200a and 200b. This read counter 300 loads a zero value with a period of 400 Hz, and starts to count a clock signal having a frequency of 27 MHz from the loaded value. The counted value of the read counter 300 is input to one of the first and second RAMs 200a and 200b as a read address. The S/P converting circuit 400 converts the serial format of the transfer data which is received into a parallel format. On the other hand, the P/S converting circuit 500 converts the parallel format of the data read out from the first and second RAMs 200a and 200b into the serial format.

Figure 4:
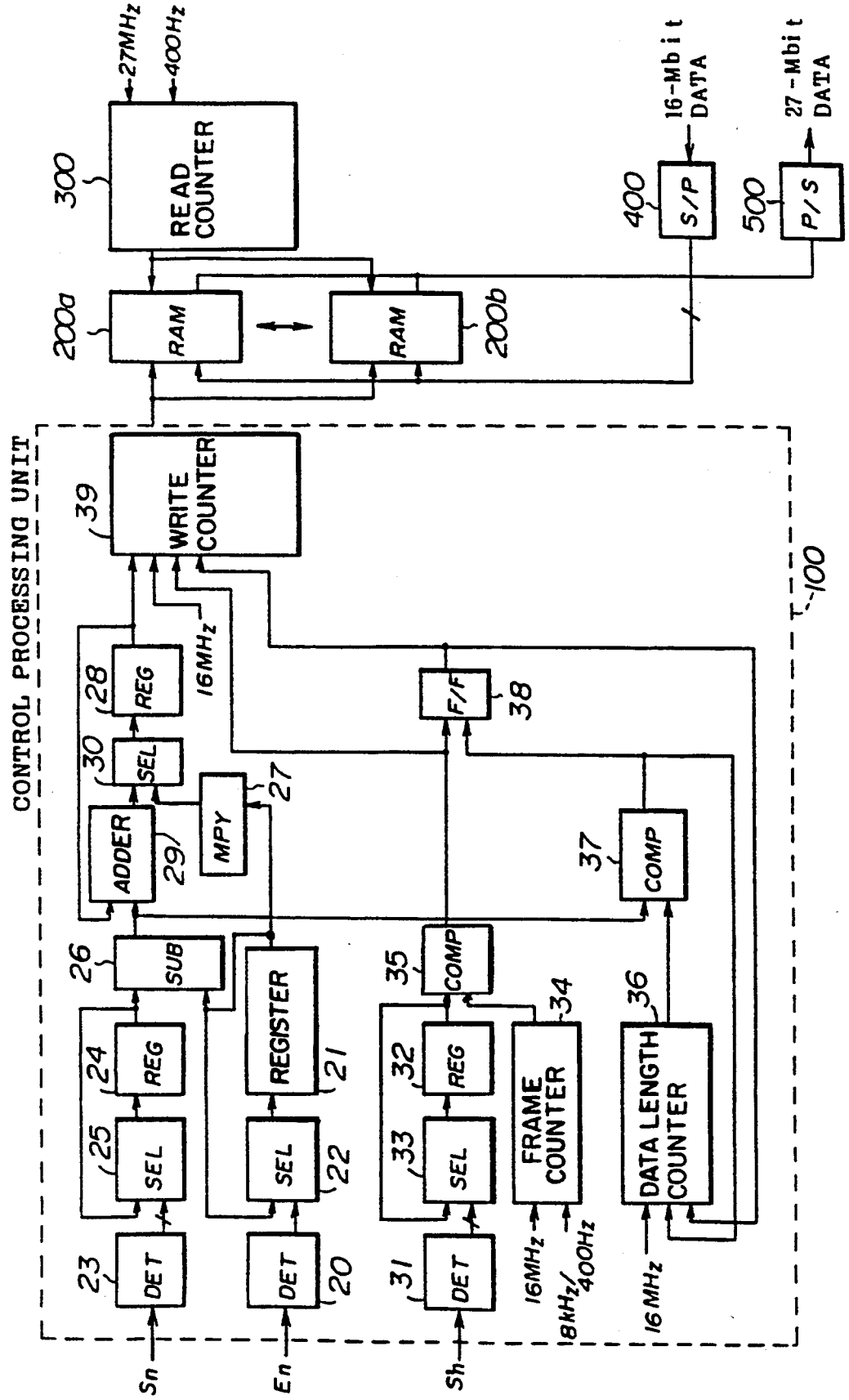
FIG. 4 is a system block diagram showing an embodiment of a transfer data storage system according to the present invention.

The control processing unit 100 includes a start address information detector 20, a start address circulating shift register 21, a start address selection circuit 22, an end address information detector 23, an end address circulating shift register 24, an end address selection circuit 25, a subtracting circuit 26, a multiplying circuit 27, a storage address circulating shift register 28, an adder 29, an initial value selection circuit 30, a start information detector 31, a start information circulating shift register 32, a start information selection circuit 33, a frame counter 34, a start detecting comparator 35, a data length counter 36, an end detecting comparator 37, a flip-flop circuit 38, and a write counter 39 which are coupled as shown in FIG. 4.

The start address information detector 20 detects start address information of each subscriber data in the transfer data which is received from an operation system (not shown). This start address information corresponds to Sn described in conjunction with FIGS. 1 and 2. The start address circulating shift register 21 holds the start address information detected by the start address information detector 20 while circulating the start address information in synchronism with the transfer times of start data of the subscriber data. The start address selection circuit 22 inputs the start address information detected by the start address information detector 20 to the start address circulating shift register 21 at a time before entering the transfer data storage process. When carrying out the transfer data storage process, the start address selection circuit 22 connects the first stage of the start address circulating shift register 21 to the last stage, so as to realize the circulation process of the start address circulating shift register 21.

The end address information detector 23 detects end address information in each subscriber data of the transfer data which is received from the operation system. This end address information corresponds to En described in conjunction with FIGS. 1 and 2. The end address circulating shift register 24 holds the end address information detected by the end address information detector 23 while circulating the end address information in synchronism with the transfer time of the start data of the subscriber data. The end address selection circuit 25 inputs the end address information detected by the end address information detector 23 to the end address circulating shift register 24 at a time before entering the transfer data storage process. When carrying out the transfer data storage process, the end address selection circuit 25 connects the first stage of the end address circulating shift register 24 to the last stage, so as to realize the circulation process of the end address circulating shift register 24. The subtracting circuit 26 calculates a difference value between the value held in the first stage of the end address circulating shift register 24 and the value held in the first stage of the start address circulating shift register 21.

The multiplying circuit 27 multiplies the initial value held in the start address circulating shift register 21 and the multiplexing frame number, and generates storage start address information to be set in the RAMs 200a and 200b. The storage start address information corresponds to 20Sn described in conjunction with FIGS. 1 and 2. The storage address circulating shift register 28 holds values amounting to the number of subscriber data while circulating the values in synchronism with the transfer time of the start data of the subscriber data. The value calculated by the multiplying circuit 27 is held in the storage address circulating shift register 28 as the initial value. The adder 29 adds the value held in the first stage of the storage address circulating shift register 28 and the difference value calculated in the subtracting circuit 26, and the added value is input to the last stage of the storage address circulating shift register 28. The initial value selection circuit 30 inputs the storage start address information calculated in the multiplying circuit 27 to the storage address circulating shift register 28 at a time before entering the transfer data storage process. When carrying out the transfer data storage process, the initial value selection circuit 30 connects the first stage of the storage address circulating shift register 28 to the last stage via the adder 29, so as to realize the circulation process of the storage address circulating shift register 28.

The start information detector 31 detects start position information of each subscriber data of the transfer data which is received from the operation system. The start position information corresponds to S'n described in conjunction with FIGS. 1 and 2. The start information circulating shift register 32 holds the start position information of the subscriber data detected by the start information detector 31, while circulating the start position information in synchronism with the transfer time of the start data of the subscriber data. The start information selection circuit 33 inputs the start position information of the subscriber data detected by the start information detector 31 to the start information circulating shift register 32 at the time before entering the transfer data storage process. When carrying out the transfer data storage process, the start information selection circuit 31 connects the first stage of the start information circulating shift register 32 to the last stage, so as to realize the circulation process of the start information circulating shift register 32. The frame counter 34 loads a zero value when one of signals having frequencies of 400 Hz and 8 kHz is received, and starts to count a clock signal having a frequency of 16 MHz from the loaded value. The start detecting comparator 35 compares the value held in the first stage of the start information circulating shift register 32 and the counted value of the frame counter 34, so as to detect the transfer time of the start data of the subscriber data.

The data length counter 36 starts to count the clock signal having the frequency of 16 MHz from zero when the start detecting comparator 35 detects the transfer time of the start data of the subscriber data. The end detecting comparator 37 compares the difference value calculated in the subtracting circuit 26 and the counted value of the data length counter 36, so as to detect the transfer time of the end data of the subscriber data. The end data corresponds to E'n described in conjunction with FIGS. 1 and 2. The output of the end detecting comparator 37 is input to a load terminal of the data length counter 36, and the data length counter 36 loads the zero value when the end detecting comparator 37 detects the transfer time of the end data of the subscriber data. The flip-flop circuit 38 is set when the start detecting comparator 35 detects the transfer time of the start data of the subscriber data, and outputs a high-level value. On the other hand, the flip-flop circuit 38 is reset when the end detecting comparator 37 detects the transfer time of the end data of the subscriber data, and outputs a low-level value. The output of the flip-flop circuit 38 is input to an enable terminal of the data length counter 36, and the data length counter 36 carries out the counting operation when the flip-flop circuit 38 outputs the high-level value, that is, when the subscriber data is received.

The write counter 39 inputs the write address with respect to the RAMs 200a and 200b. This write counter 39 is set to an enabled state and counts the clock signal having the frequency of 16 MHz when the flip-flop circuit 38 outputs the high-level value. In other words, when the start detecting comparator 35 detects the transfer time of the start data of the subscriber data, the write counter 39 loads the value held in the first stage of the storage address circulating shift register 28 and starts to count the clock signal from the loaded value. On the other hand, the write counter 39 ends the counting operation when the end detecting comparator 37 detects the transfer time of the end data of the subscriber data.

Next, the operation of the embodiment will be described when converting the format structure of the transfer data shown in FIG. 1 into the data structure shown in FIG. 2.

In the initial state, the start address circulating shift register 21 holds S1, S2, S3, ..., S16 from the first stage. When carrying out the transfer data storage process, the start address circulating shift register 21 holds these values while circulating the values in synchronism with the transfer time of the start data of the subscriber data. In addition, the end address circulating shift register 24 holds in the initial state E1, E2, E3, ..., E16 from the first stage. When carrying out the transfer data storage process, the end address circulating shift register 24 holds these values while circulating the values in synchronism with the transfer time of the start data of the subscriber data. Responsive to the above described holding process, the subtracting circuit 26 calculates Δn (≡En−Sn) in a circulating manner as Δ1, Δ2, ..., Δ16, Δ1, Δ2, ..., Δ16, Δ1, ... in synchronism with the transfer time of the start data of the subscriber data.

On the other hand, the multiplying circuit 27 calculates 20S1, 20S2, 20S3, ..., 20S16. The storage address circulating shift register 28 receives the multiplication results of the multiplying circuit 27 and holds 20S1, 20S2, 20S3, ..., 20S16 from the first stage in accordance with the selection process of the initial value selection circuit 30 at the start of the reception of the first frame of the transfer data. The storage address circulating shift register 28 holds (20S1+Δ1), (20S2+Δ2), (20S3+Δ3), ..., (20S16+Δ16) from the first stage in accordance with the adding process of the adder 29 at the start of the reception of the second frame of the transfer data. The storage address circulating shift register 28 holds (20S1+2Δ1), (20S2+2Δ2), (20S3+2Δ3), ..., (20S16+2Δ16) from the first stage in accordance with the adding process of the adder 29 at the start of the reception of the third frame of the transfer data. The storage address circulating shift register 28 holds the data similarly by renewing the data in accordance with the adding process of the adder 29 at the start of the reception of the other frames of the transfer data. At the start of the reception of the last frame, that is, the twentieth frame, of the transfer data, the storage address circulating shift register 28 holds (20S1+19Δ1), (20S2+19Δ2), (20S3+19Δ3), ..., (20S16+19Δ16) from the first stage.

In the initial state, the start information circulating shift register 32 holds S'1, S'2, S'3, ..., S'16 from the first stage. When carrying out the transfer data storage process, the start information circulating shift register 32 holds these values while circulating the values in synchronism with the transfer time of the start data of the subscriber data. Responsive to the circulating hold process of the start information circulating shift register 32, the start detecting comparator 35 sets the flip-flop circuit 38 every time the start data of the subscriber data is transferred, and instructs the write counter 39 to load the value held in the first stage of the storage address circulating shift register 28. When the flip-flop circuit 38 is set in this manner, the flip-flop circuit 38 outputs a high-level value and instructs the write counter 39 to count the clock signal and instructs the data length counter 36 to count the clock signal. Responsive to the instruction from the flip-flop circuit 38, the write counter 39 starts to count from the value which is held in the first stage of the storage address circulating shift register 28 and is loaded into the write counter 39, and the data length counter 36 starts to count from the zero value. In accordance with the counting operation of the data length counter 36, the end detecting comparator 37 detects the transfer time of the end data of the subscriber data which activated the counting operation and resets the flip-flop circuit 38, so as to instruct the write counter 39 to stop counting the clock signal. Therefore, the write counter 39 loads the value which is held in the first stage of the storage address circulating shift register 28 when the start detecting comparator 35 detects the transfer time of the start data of the subscriber data, and starts to count from the loaded value. In addition, the write counter 39 ends the counting operation when the end detecting comparator 37 detects the transfer time of the end data of the subscriber data.

Responsive to the above described operation, the write counter 39 counts from 20S1 to 20S1+Δ1 when receiving the first frame of the transfer data, and then counts from 20S2 to 20S2+Δ2. Next, the write counter 39 counts from 20S3 to 20S3+Δ3, and continues the counting operation similarly until finally counting from 20S16 to 20S16+Δ16. When receiving the second frame of the transfer data, the write counter 39 counts from 20S1+Δ1 to 20S1+2Δ1, and then counts from 20S2+Δ2 to 20S2+2Δ2. Next, the write counter 39 counts from 20S3+Δ3 to 20S3+2Δ3, and continues the counting operation similarly until finally counting from 20S16+Δ16 to 20S16+2Δ16. Thereafter, the counting operation of the write counter 39 is carried out similarly up to the time when the twentieth frame of the transfer data is received.

Responsive to the counting operation of the write counter 39, the RAMs 200a and 200b which are selected as the memories to which the data are to be written write the transfer data which is received into the address positions specified by the counted value of the write counter 39. By this write operation, the transfer data having the format structure described in conjunction with FIG. 1 is converted into the data having the data structure described in conjunction with FIG. 2 and written into the RAMs 200a and 200b.

Figure 5:
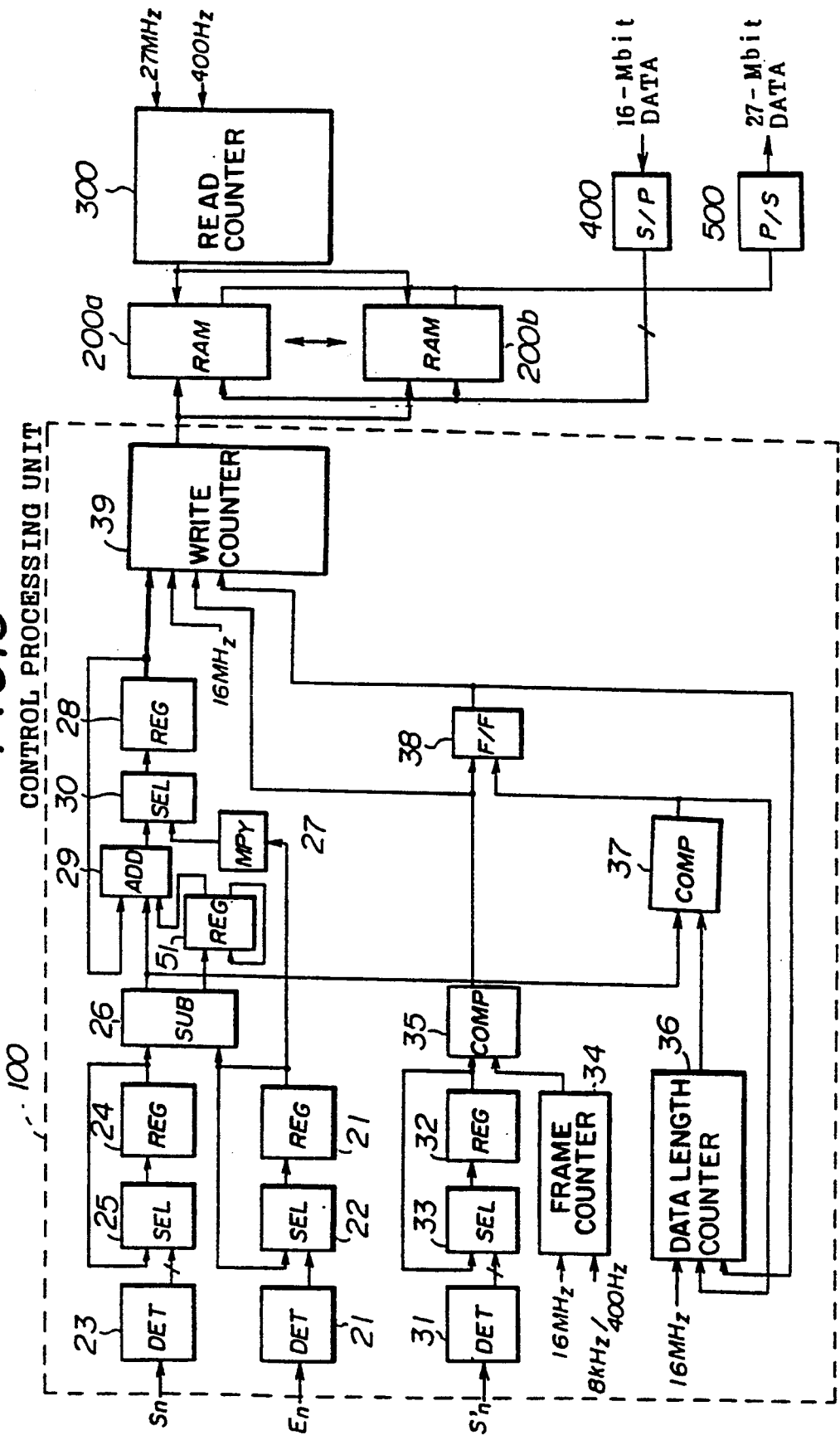
FIG. 5 is a system block diagram showing a modification of the embodiment shown in FIG. 4.

In the embodiment described above, the start address circulating shift register 21, the end address circulating shift register 24 and the subtracting circuit 26 are provided to input the data length information of each subscriber data to the adder 29 in a circulating manner. However, as a modification of this embodiment, it is possible to provide a circulating shift register 51 between the subtracting circuit 26 and the adder 29 as shown in FIG. 5. In FIG. 5, those parts which are the same as those corresponding parts in FIG. 4 are designated by the same reference numerals, and a description thereof will be omitted. According to this modification, the circulating shift register 51 holds the data length information in the circulating manner, so that the data length information of each subscriber data is input to the adder 29 in the circulating manner.

Figure 6:
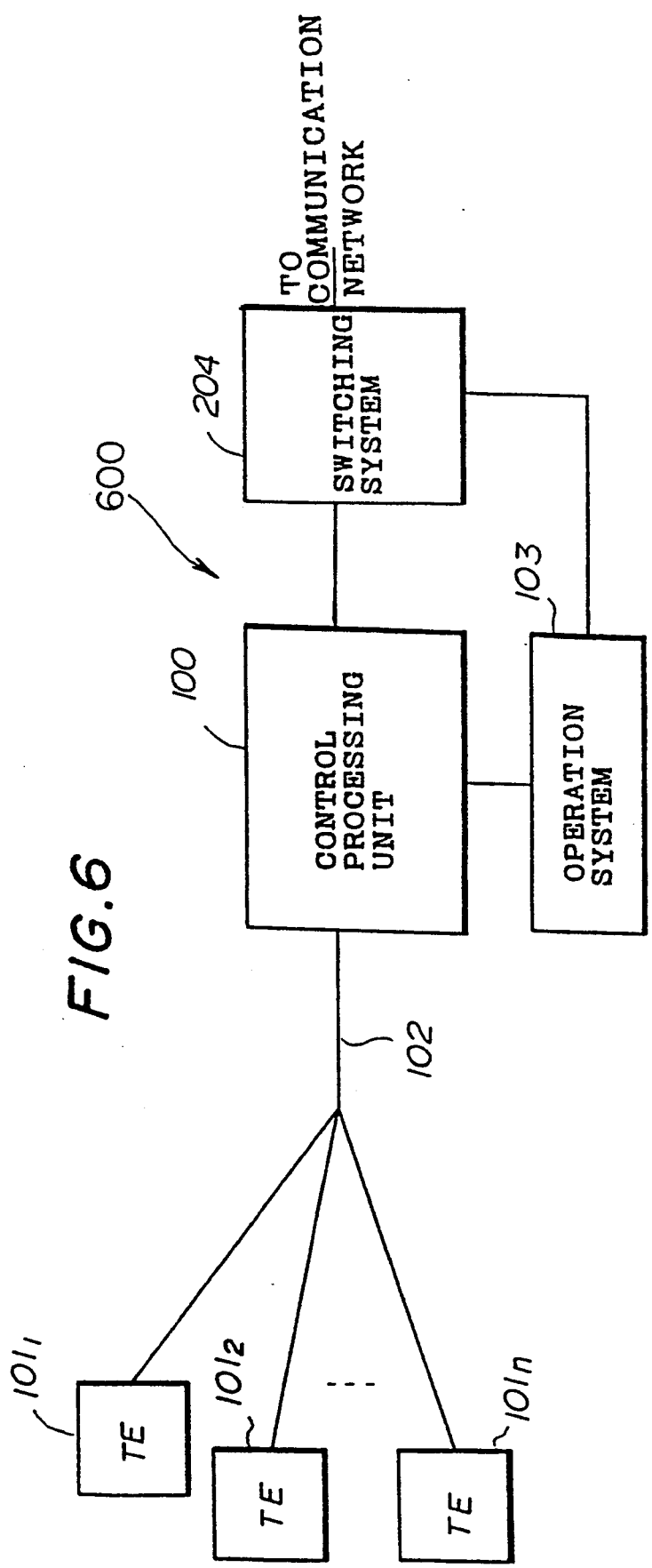
FIG. 6 is a system block diagram showing a communication system to which the present invention may be applied.

FIG. 6 shows a communication system to which the transfer data storage system according to the present invention may be applied. In FIG. 6, a subscriber line terminal equipment 600 includes a control processing unit 100 and an operation system 103. The control processing unit 100 and the operation system 103 are coupled to a switching system 204. The control processing unit 100 is coupled to a plurality of terminal equipments $101_1$ through $101_n$ via a subscriber line 102.

The subscriber line terminal equipment 600 broadcasts data to each of the terminal equipments $101_1$ through $101_n$ via the subscriber line 102. On the other hand, the terminal equipments $101_1$ through $101_n$ transmit data to the subscriber line terminal equipment 200 via the subscriber line 102 at mutually different time slots. That is, by the data from the terminal equipments $101_1$ through $101_n$ are multiplexed and transmitted to the subscriber line terminal equipment 600 in frames. The data transmitted from the terminal equipments $101_1$ through $101_n$ may have different data lengths.

FIG. 7 generally shows the operation of the control processing unit 100 shown in FIG. 6, and more particularly, to the operation of a control part (not shown) of the control processing unit 100. In FIG. 7, a step S1 enters the users by registering telephone numbers of the users. A step S2 enters the size of each service, that is, the number of bytes used for each service. The users and the size of the service entered at the steps S1 and S2 are supplied to the operation system 103. A step S3 reads the user width of all of the users up to the present, and a step S4 obtains S'n for $n = 1, \ldots, 16$, for example. A step S5 calculates the end of each user width Sn, and a step S6 calculates the start of each user width En. A step S7 writes the obtained S'n, Sn and En into the corresponding shift registers 32, 21 and 24 of the control processing unit 100.

The present invention is not limited to the above-described embodiments, but various variations and modifications may be made without departing from the scope of the present invention.

What is claimed is:

1. A transfer data storage system for a control processing unit which receives a transfer data in which a plurality of kinds of data having arbitrary data lengths are allocated within each frame, extracts each data within the transfer data included in a predetermined number of frames by the kind of data, and successively stores the extracted data into memory means, said transfer data storage system comprising:

first register means having a plurality of stages for holding values corresponding to the number of kinds of data being transferred while circulating the values in synchronism with data transfer times when the kind of data of the transfer data being transferred is switched;

adder means for adding a value held in a first stage of said first register means and data length information of each kind of data obtained in a circulating manner, and for inputting an added value to a last stage of said first register means;

write counter means for loading the value held in the first stage of said first register means as an initial value at a start of a counting operation and counting a clock signal from the loaded value when the received transfer data corresponds to a start data of the kind of data, and for ending the counting operation when the received transfer data corresponds to an end data of the kind of data, the received transfer data being written into the memory means at address positions specified by a counted value of said write counter means;

second register means for holding in a circulating manner values which are obtained by subtracting the predetermined number of frames from storage start address information of each kind of data;

third register means for holding in a circulating manner values which are obtained by subtracting the predetermined number of frames from storage start address information of each kind of data; and subtracting means, coupled to said second and third register means, for calculating a difference value between a value held in a first stage of said second register means and a value held in a first stage of said third register means, said difference value being input to said adder means as the data length information.

2. The transfer data storage system as claimed in claim 1, which further comprises:

fourth register means for holding in a circulating manner start position information of the kinds of data of the transfer data;

first counter means for starting a count of the clock signal from a zero value every time a start position of the frame is reached;

first comparator means, coupled to said fourth register means and said first counter means, for comparing a value held in a first stage of said fourth register means and a counted value of said first counter means, said write counter means detecting the start data of the kinds of data of the transfer data which is received based on a comparison result of said first comparator means.

3. The transfer data storage system as claimed in claim 2, which further comprises:

second counter means for starting a count of the clock signal from a zero value when said first comparator means detects the start data; and second comparator means for comparing the data length information input to the adder means in the circulating manner and a counted value of said second counter means, said write counter means detecting the end data of the kinds of data of the transfer data which is received based on a comparison result of said second comparator means.

4. The transfer data storage system as claimed in claim 1, which further comprises:

counting means for starting a count of the clock signal from a zero value when the start data is supplied to said write counter means; and comparator means for comparing the data length information input to the adder means in the circulating manner and a counted value of said counting means, said write counter means detecting the end data of the kinds of data of the transfer data which is received based on a comparison result of said comparator means.

5. A transfer data storage system for a control processing unit which receives a transfer data in which a plurality of kinds of data having arbitrary data lengths are allocated within each frame, extracts each data within the transfer data included in a predetermined number of frames by the kind of data, and successively stores the extracted data into memory means, said transfer data storage system comprising:

first register means having a plurality of stages for holding values corresponding to the number of kinds of data being transferred while circulating the values in synchronism with data transfer times when the kind of data of the transfer data being transferred is switched;

adder means for adding a value held in a first stage of said first register means and data length information of each kind of data obtained in a circulating manner, and for inputting an added value to a last stage of said first register means;

write counter means for loading the value held in the first stage of said first register means as an initial value at a start of a counting operation and counting a clock signal from the loaded value when the received transfer data corresponds to a start data of the kind of data, and for ending the counting operation when the received transfer data corresponds to an end data of the kind of data, the received transfer data being written into the memory means at address positions specified by a counted value of said write counter means;

additional register means for holding in a circulating manner start position information of the kinds of data of the transfer data;

counting means for starting a count of the clock signal from a zero value every time a start position of the frame is reached; and comparator means, coupled to said additional register means and said counting means, for comparing a value held in a first stage of said additional register means and a counted value of said counting means, said write counter means detecting the start data of the kinds of data of the transfer data which is received based on a comparison result of said comparator means.

6. A transfer data storage system for a control processing unit which receives a transfer data in which a plurality of kinds of data having arbitrary data lengths are allocated within each frame, extracts each data within the transfer data included in a predetermined number of frames by the kind of data, and successively stores the extracted data into memory means, said transfer data storage system comprising:

first register means having a plurality of stages for holding values corresponding to the number of kinds of data being transferred while circulating the values in synchronism with data transfer times when the kind of data of the transfer data being transferred is switched;

adder means for adding a value held in a first stage of said first register means and data length information of each kind of data obtained in a circulating manner, and for inputting an added value to a last stage of said first register means;

write counter means for loading the value held in the first stage of said first register means as an initial value at a start of a counting operation and counting a clock signal from the loaded value when the received transfer data corresponds to a start data of the kind of data, and for ending the counting operation when the received transfer data corresponds to an end data of the kind of data, the received transfer data being written into the memory means at address positions specified by a counted value of said write counter means;

counting means for starting a count of the clock signal from a zero value when the start data is supplied to said write counter means; and comparator means for comparing the data length information input to the adder means in the circulating manner and a counted value of said counting means, said write counter means detecting the end data of the kinds of data of the transfer data which is received based on a comparison result of said comparator means.

* * * * *